United States Patent
Huang et al.

(10) Patent No.: US 7,736,266 B2
(45) Date of Patent: Jun. 15, 2010

(54) VEHICLE'S ACTIVE ELECTRICALLY CONTROLLED NON-STEP SPEED CHANGE MECHANISM

(75) Inventors: Kuohsiu David Huang, Taoyuan (TW); Kei-Lin Kuo, Baoshan Township, Hsinchu County (TW)

(73) Assignee: National Taipei University of Technology, Taipei (TW)

( * ) Notice: Subject to any disclaimer, the term of this patent is extended or adjusted under 35 U.S.C. 154(b) by 397 days.

(21) Appl. No.: 11/828,041

(22) Filed: Jul. 25, 2007

(65) Prior Publication Data

US 2009/0029828 A1 Jan. 29, 2009

(51) Int. Cl.
*B60K 1/02* (2006.01)
*B60K 6/445* (2006.01)
*B60K 1/00* (2006.01)
*H02P 17/00* (2006.01)
*F16H 3/72* (2006.01)
*F16H 37/06* (2006.01)

(52) U.S. Cl. .......... 477/3; 477/15; 475/5; 475/9; 903/909; 903/910; 903/917; 903/918; 903/945; 290/1 C; 290/4 C; 180/65.235; 180/65.24; 180/65.28; 180/65.7; 180/65.6

(58) Field of Classification Search .......... 475/4, 475/5, 9, 10; 903/903, 909, 910, 917, 918; 290/1 C, 4 C; 180/65.21, 65.235, 65.24, 180/65.6, 65.7

See application file for complete search history.

(56) References Cited

U.S. PATENT DOCUMENTS

| | | | | |
|---|---|---|---|---|
| 6,007,443 A | * | 12/1999 | Onimaru et al. | 475/5 |
| 6,184,603 B1 | * | 2/2001 | Hamai et al. | 310/75 R |
| 6,524,216 B2 | * | 2/2003 | Suzuki et al. | 477/3 |
| 6,852,055 B2 | * | 2/2005 | Kmicikiewicz | 475/5 |
| 7,070,530 B2 | * | 7/2006 | Ai et al. | 475/5 |
| 7,246,672 B2 | * | 7/2007 | Shirai et al. | 180/65.25 |
| 2001/0016532 A1 | * | 8/2001 | Jung | 475/5 |

FOREIGN PATENT DOCUMENTS

WO   WO 2006024870 A1 * 3/2006

* cited by examiner

*Primary Examiner*—Tisha D Lewis
(74) *Attorney, Agent, or Firm*—Chun-Ming Shih

(57) ABSTRACT

A vehicle's active electrically controlled non-step speed change mechanism includes an internal combustion engine, a dynamo (motor-generator), a power allotment unit and an active electrically controlled non-step speed changer to control vehicle able to run in the best condition notwithstanding its speed, roadway condition or load thereby achieving the aim of fuel saving and minimizing the environmental contamination due to excess discharge of exhaust gas.

8 Claims, 9 Drawing Sheets

VEHICLE'S ACTIVE ELECTRICALLY CONTROLLED NON-STEP SPEED CHANGE MECHANISM

BACKGROUND OF THE INVENTION

1. Field of the Invention

The present invention relates to a vehicle's active electrically controlled non-step speed change mechanism, and more particularly, to an active electrically controlled non-step speed change mechanism equipped in a vehicle to control a dynamo (motor-generator), and an internal combustion engine operation with computer aid according to roadway condition and vehicle speed so as to bring the internal combustion engine to operate at the best working state thereby achieving the aim of curtailing the amount of fuel consumption and minimizing exhaust gas discharge.

2. Description of the Prior Art

There has been developed a hybrid power vehicle that may lower environmental contamination arisen from the use of internal combustion engine in three categories, namely cascade, parallel, and cascade-parallel.

(1). Cascade type: In this type the internal combustion engine is only used to drive the generator, and the power for vehicle is completely supplied by a motor. It has the merits of simple in construction and easy to bring the internal combustion engine to operate at best condition. On the contrary, since the internal combustion engine is used only to drive the generator, and the work required for carrying and driving the vehicle depends totally on the motor, which results in energy loss and a poor efficiency. As a result, the aim of allotment of two-power source is insignificant.

(2). Parallel type: In this type the operational efficiency will be somewhat better than the former type, and its internal combustion engine and motor are able to work simultaneously in the case to carry a heavy load, crumbing the slope, instantaneous acceleration etc. such that an optimal integrative combined power of the two different sources can be obtained at the crucial moment. During the time the output of the internal combustion engine is sufficient to drive the vehicle, it can at the same time operate the generator to charge the storage battery. In starting or slow speed running, the motor can be employed to provide the power without actuating the internal combustion engine.

(3). Jointed cascade parallel type: In comparison to the precedent two types, this type can serve more effectively to make use of the two different power sources suitable for applying to various operation modes. Though speaking of the mechanism as a whole, it is much complicated than that of a cascade type, yet it is much more efficient than a conventional internal combustion engine and the cascade type with less contamination. This is why many manufacturers including Industrial Technology Research Institute are actively devoting with great efforts for studying this type of vehicle. As a matter of fact, the engine output of this type is adjusted from time to time in accordance with the speed of the vehicle. The problem of contamination at low engine speed is not so serious as the traditional vehicle; the energy wasting at high speed is still in negligible.

Recently, the special recreation vehicle has become a favorite of the youth. Take the heavy-duty cars for example; there are types of cruising, sports, racing, dune buggy on sand and runabout etc. All of them are five to six stepped speed or CVT non-step speed change types; the form of power transmission may be in belt conveyor, sprocket or output shaft. No matter what form of gearshift is used, it is difficult to fully exhibit the best engine efficiency. The most important reason lies in that the speed range of a traditional engine is too broad because the vehicle has to encounter rapid acceleration or deceleration very often.

As shown in FIG. 1, the internal combustion engine of the hybrid power system which is presently on market is controlled to operation on the best working line extended from the idle speed to the most fuel saving speed, operating under such control will never be able to cause the system operate with the merits of low contamination, low energy consumption and low noise.

As the automobile industry in Taiwan has very firm foundation, some of them have advanced one step forwards to the study and development of the pure electrical vehicle and there have been primitive products presented on market. It is pitiful that they still have no way to be liberated from the inherent flaws of short cruising distance and inconvenience in recovery of electrical power. On the contrary, there are seldom who are willing to devote in study of hybrid electric vehicle for reason that it demands a huge amount of several million Us dollar investment against a very poor occupation rate of automobile sales on the international market.

In view of the foregoing situation, the applicant of the present invention herein conducted intensive research based on many years of experience gained through professional engagement in the manufacturing of related products, with continuous experimentation and improvement culminating in the development of vehicle's active electrically controlled non-step speed change mechanism of the present invention which will be elucidated hereinafter.

SUMMARY OF THE INVENTION

The present invention is to provide a vehicle's active electrically controlled non-step speed change mechanism which can be used to operate the internal combustion engine to work in the best condition thereby minimizing the fuel consumption and exhaust gas discharge in accordance with roadway condition and vehicle speed.

Another, the present invention is to maintain the internal combustion engine to work at the best condition and the motor to work with the preferable output torque no matter the vehicle is in the state of modest starting, cruising at medium speed, or galloping at high speed to obtain an optimal performance of the combined power imparted by the mechanism.

The mechanism of the present invention comprises an internal combustion engine, an power allotment unit, a dynamo (motor-generator), and an active electrically controlled non-step speed changer. The vehicle's internal combustion engine and the dynamo (motor-generator) can be arranged to independently operate as an engine, motor and generator to individually output their power, or integrative combine engine and generator, or engine and motor to work in a hybrid power mode according to the vehicle speed. During low speed running, the motor acts as the driver whose speed is controlled by varying its load current. The motor is shut off and the internal combustion engine is initiated when the motor output is insufficient to carry the load, and the engine is brought to maintain at the preferable working region. During medium speed running, the generator may be started to charge the storage battery when its remaining capacity is insufficient. In the event the power required for running the vehicle exceeds engine's capability, the motor and engine are all operated to jointly supply power for the vehicle to maintain running at high speed. As the mechanism is able to control the engine to operate at the preferable working region at any different roadway condition, the engine has no worry to shift off the preferable working region if the power allotment unit switches the dynamo to operate as a generator to charge the storage battery with the extra power. This active electrically controlled speed changer is interposed between the output end of the power allotment unit and the vehicle wheels to regulate the varying load so as to maintain the internal combustion engine always working at the preferable working region.

Accordingly, as shown in FIG. 2, the operation policy of the mechanism of the present invention is to maintain the internal combustion engine to work at working regions Pe1 and Pe2 so as to achieve the aim of saving energy while minimizing environmental pollution notwithstanding the vehicle is running at low, medium or high speed, and motor is also delivering the most preferable output torque. Such an outstanding characteristic can never be attained by the resembling vehicle's engine, which is designed to work along an optimal operating line.

BRIEF DESCRIPTION OF THE DRAWINGS

The accompanying drawings, which are included to provide a further understanding of the invention and incorporated in and constitute a part of this specification, illustrate the embodiment of the invention and together with the description serve to explain the principle of the invention, wherein.

DETAILED DESCRIPTION OF THE PREFERRED EMBODIMENT

Figure 1:
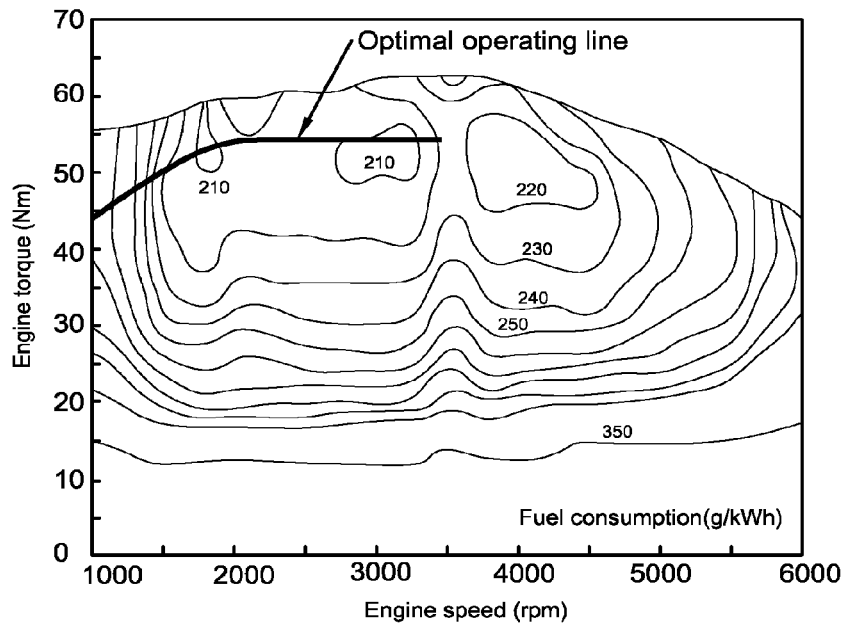
FIG. 1 shows an optimal operation line of a conventional vehicle engine.
Figure 2:
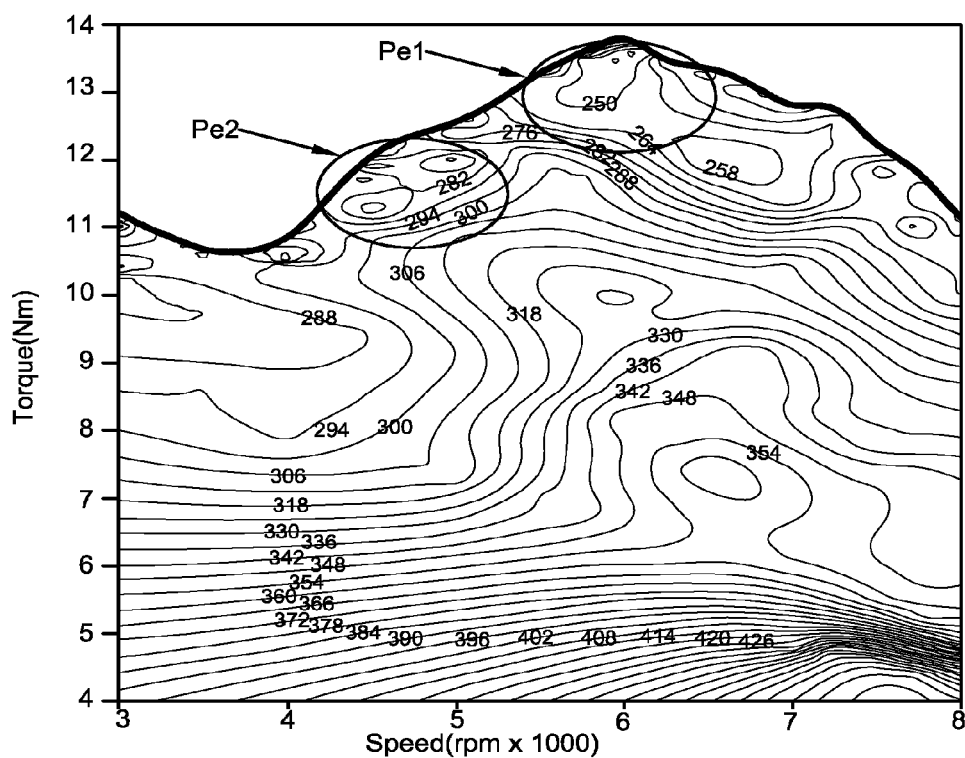
FIG. 2 shows the preferable working regions of the vehicle engine equipped with the mechanism of the present invention.
Figure 3:
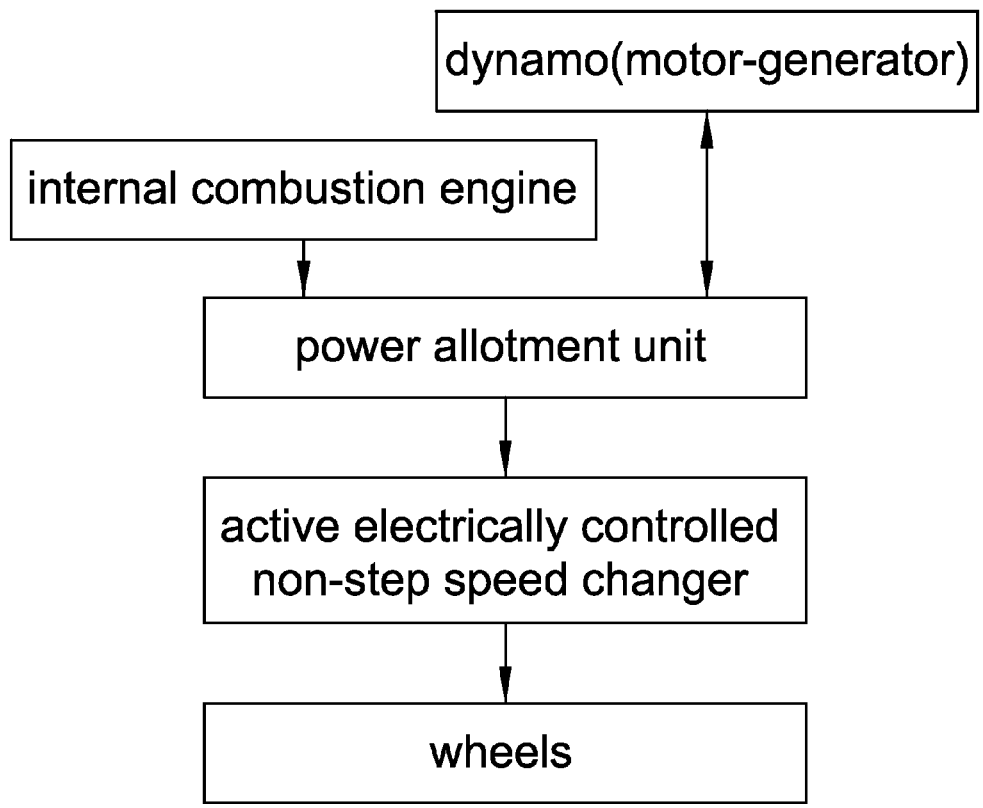
FIG. 3 is a block diagram illustrating the scheme of the present invention.
Figure 4A:
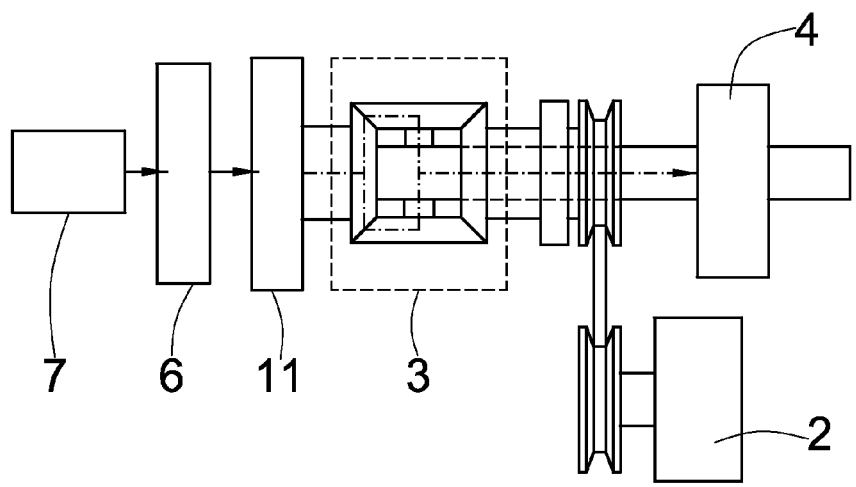
FIGS. 4(A), (B), (C) are schematic views of various power transmission modes according to the present invention.

Referring to FIG. 3 through FIGS. 4(A), (B), (C), the present invention comprises following component parts.

A dynamo (motor-generator) 1 rotates forward to serve as a motor 11 to provide an power allotment unit 3 with an operation power. If it rotates in reversed direction, it serves as a generator 12 to charge a storage battery 7 to store electricity therein via electric power controller 6.

An internal combustion engine 2 is to provide the power allotment unit 3 with operating power.

The aforesaid power allotment unit 3 is for receiving the output from the dynamo (M-G) 1 or the internal combustion engine 2, and transmits the combined power to an active electrically controlled non-step speed changer 4.

The aforesaid active electrically controlled non-step speed changer 4 is for receiving the power transmitted from the power allotment unit 3 to control vehicle speed according to the different roadway condition and vehicle load so as to operate the internal combustion engine 2 working in the most preferable range, and the motor 11 to maintain the most preferable torque output, and further to transmit most preferable power to the wheels 5. The aforesaid speed changer 4 may be formed of a planetary gear set, differential gear set, or the like.

With this structure, according to the different road conditions and vehicle speeds, the motor 11 and engine 2 may select their own optimal working mode so as to minimize fuel consumption and extra exhaust gas.

Modes of low speed slowing, medium speed cruising, and high speed galloping will be illustrated hereinafter.

1. Low speed mode: As shown in FIG. 4A, the storage battery 7 imparts driving power to the motor 11 which rotates at a low speed but a high power to transmit the power to the power allotment unit 3 and then the power is transmitted to the speed changer 4 after proper allotment thereby allowing the motor 11 to operate with the most preferable torque output.

Figure 4B:
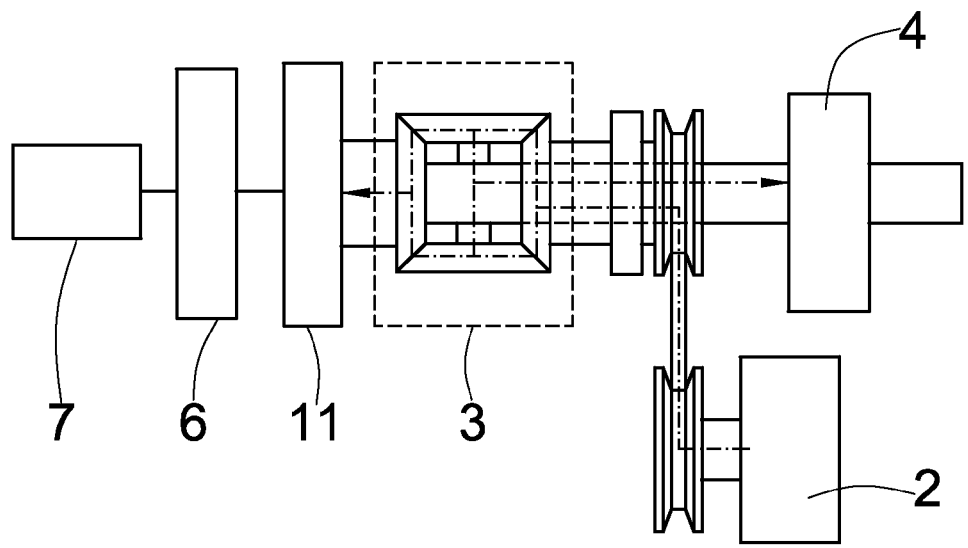

2. Medium speed mode: As shown in FIG. 4B, when the motor 11 runs to reach certain speed, it may not be able to supply power required by the vehicle any more, at this moment the vehicle computer indicates the internal combustion engine 2 to start working, and the storage battery 7 may drive the motor 11 to act as a generator 12 should its remaining electricity be sufficient, the produced power is transmitted to the power allotment unit 3, and then to the speed change 4 after proper allotment thereby controlling the engine 2 to work at the most preferable region. If the remaining electricity in the storage battery 7 is judged to be insufficient by the computer, the dynamo 1 serving as the generator 12 will be started to charge the storage battery 7.

Figure 4C:
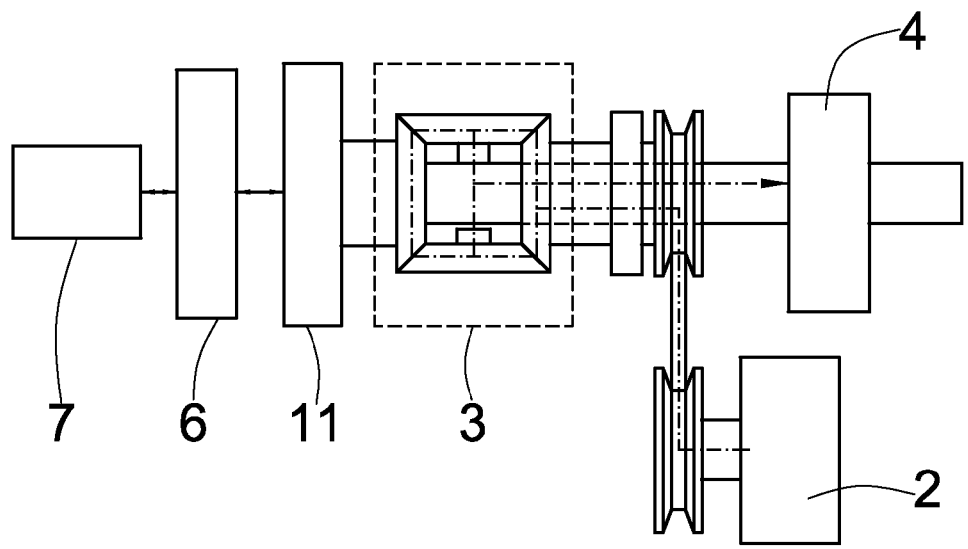

3. High speed mode: As shown in FIG. 4C, when the vehicle's load increases by bad roadway condition or it needs to accelerate, the engine 2 will no more be possible to maintain working at the preferable working region to withstand the increase of load or speed. At this moment the computer instructs the motor 11 and the engine 2 to work simultaneously to transmit their power to the power allotment unit 3, and then to the speed changer 4 after proper allotment thereby controlling the motor 11 and the engine 2 to return to their respective preferable working region.

Figure 5A:
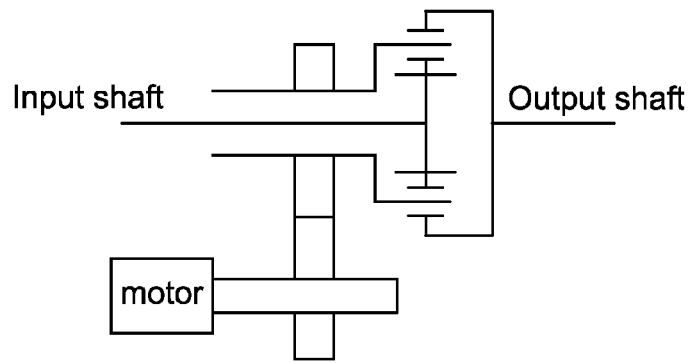
FIGS. 5(A), (B), (C) are schematic views showing various planetary gear connections in the mechanism of the present invention.
Figure 5B:
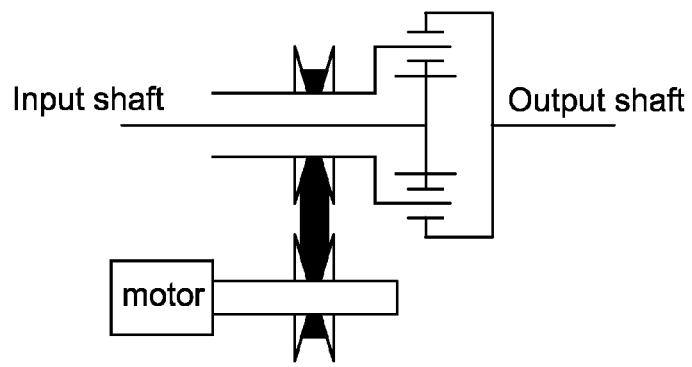

As shown in FIGS. 5(A), (B), (C), the vehicle's active electrically controlled non-step speed change mechanism of the present invention may have various forms of planetary gear connections to let the engine 2 work at the most preferable region and the motor 12 to maintain its most preferable torque output in all speed (low, medium, high) modes so as to exhibit the effectiveness of the hybrid power system of the present invention which no other automobile production is able to carry out. (in the above figures, input shaft is connected with the power allotment unit, output shaft is connected to the terminal transmission means, and motor is an electrically controlled speed governor motor).

Figure 7:
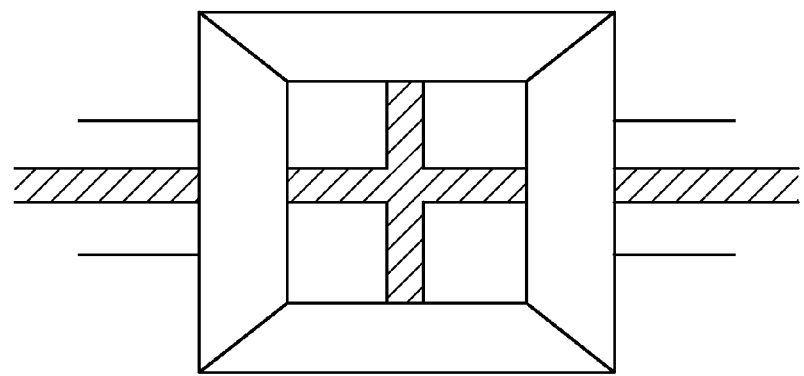
FIG. 7 is a schematic view showing the connection of the differential gear in the mechanism of the present invention; and, FIGS. 8(A), (B), (C) are various speed control curves performed by the differential gear set in the mechanism of the present invention.

Referring to FIG. 6 to FIG. 8, the non-step speed changer 4 of the present invention may be formed by connection of a planetary gear set or a differential gear set which will be illustrated as follows.

Figure 5C:
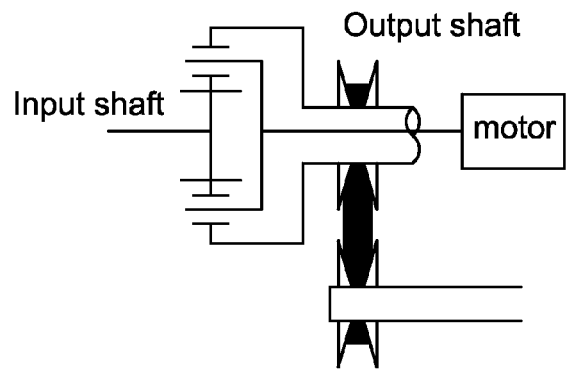
Figure 6A:
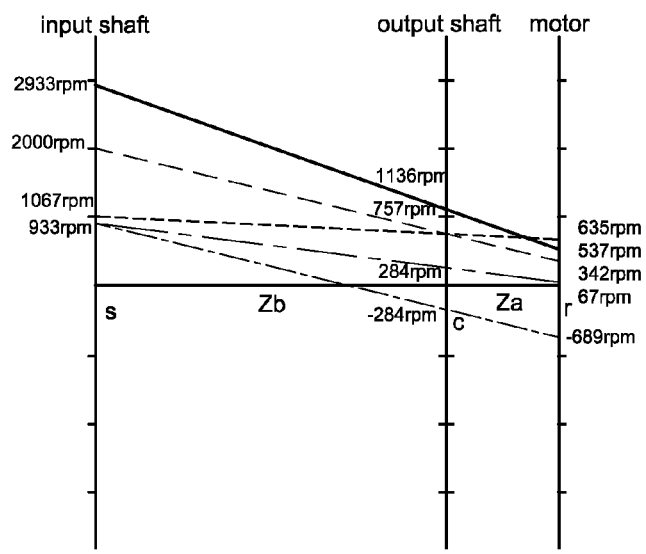
FIGS. 6(A), (B), (C), (D), (E), (F) are schematic views showing various speed control mode performed by the planetary gear set in the mechanism of the present invention.
Figure 6B:
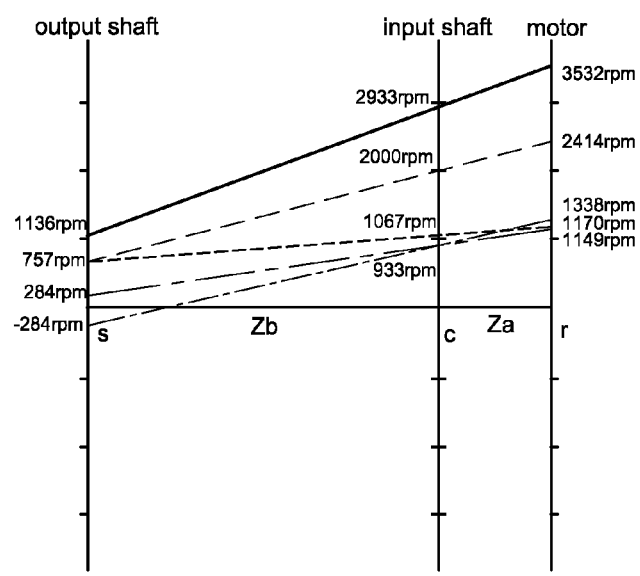
Figure 6C:
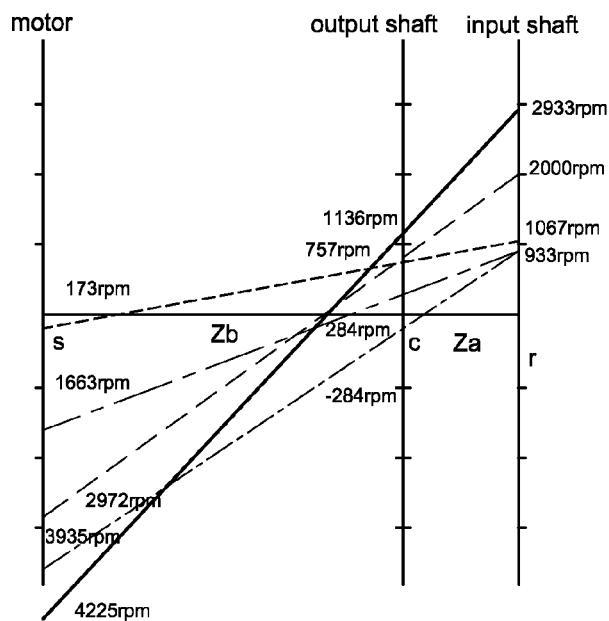
Figure 6D:
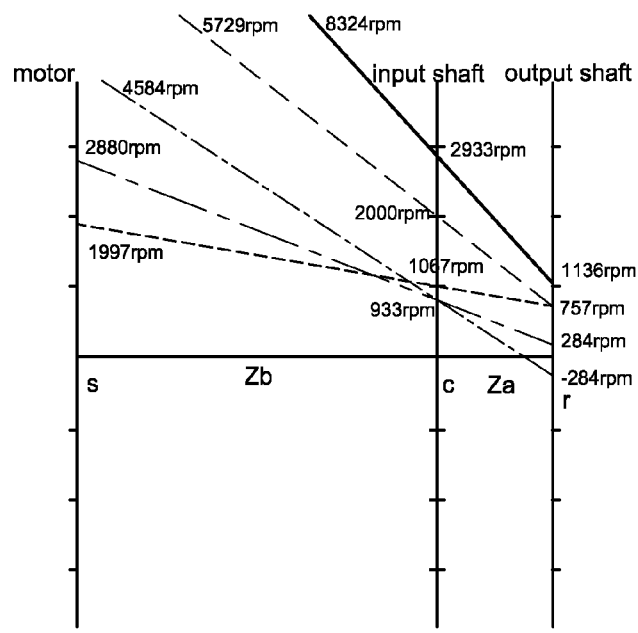
Figure 6E:
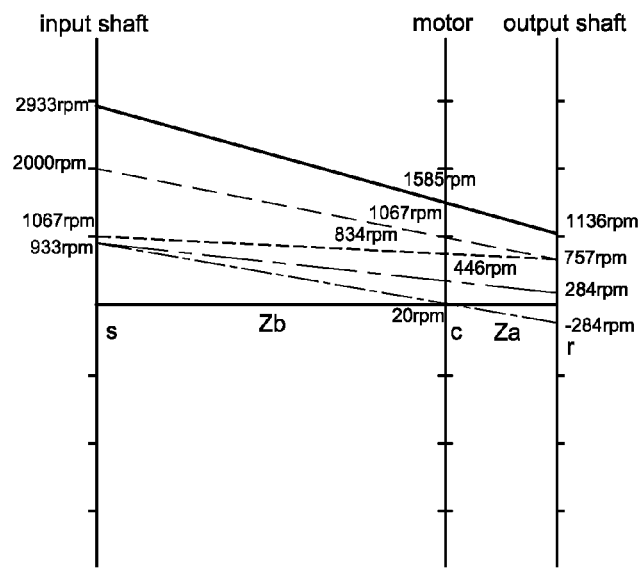
Figure 6F:
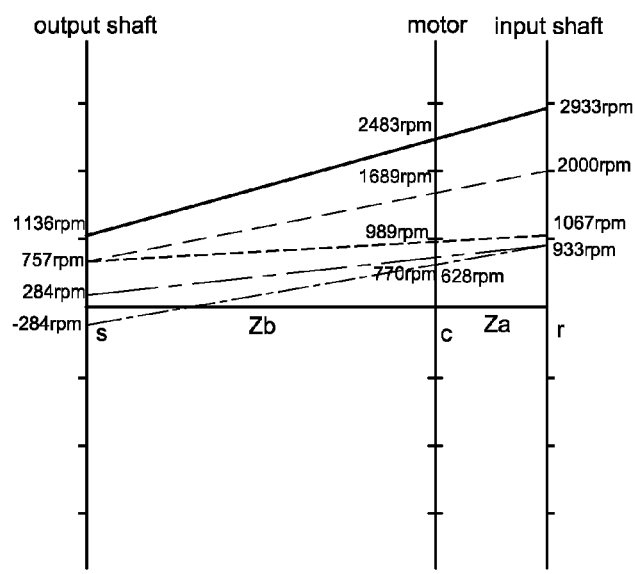

1. Planetary gear set: the planetary gear non-step speed changer may be classified into two categories. The first one makes use of the output power of the power allotment unit 3 as its input; the second one uses the power produced by forward and reverse rotation of the dynamo 1 (motor-generator) as an input. With this scheme the power output from the output shaft of the planetary gear set will be able to maintain the engine 2 working at the most preferable region at any different roadway condition and vehicle speed (see FIG. 5C) by connecting the input side to the sun gear, the output side to the planet gear, and the supporting bracket of the planetary gear set is connected to the motor 11. By connecting the input shaft, the motor 11 and the output shaft in different positions according to the characteristic motion of the planetary gear set represented by the formula $Ns+\alpha Ns-(1+\alpha)Nc=0$, there may be six possible arrangements shown in FIG. 6(A) to FIG. 6(F).

Figure 8A:
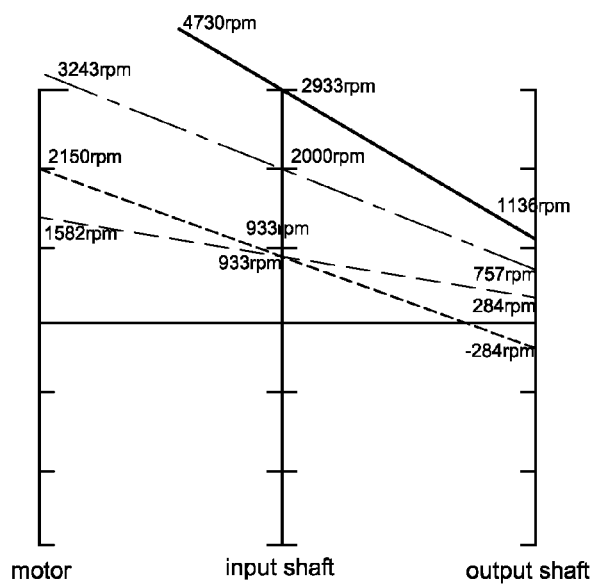
Figure 8B:
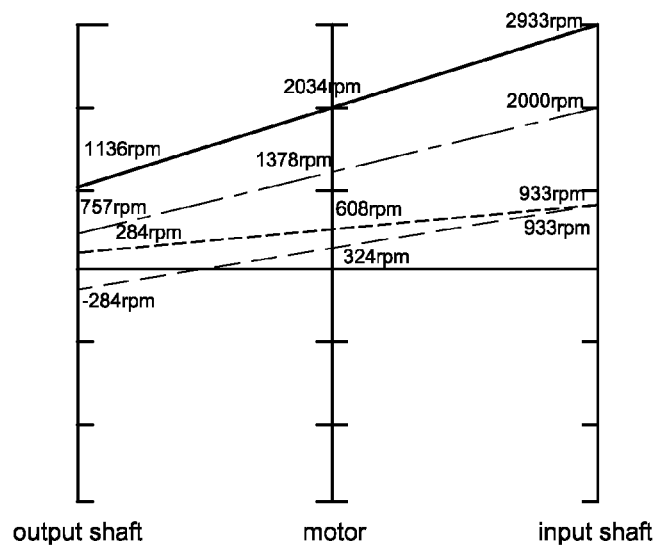
Figure 8C:
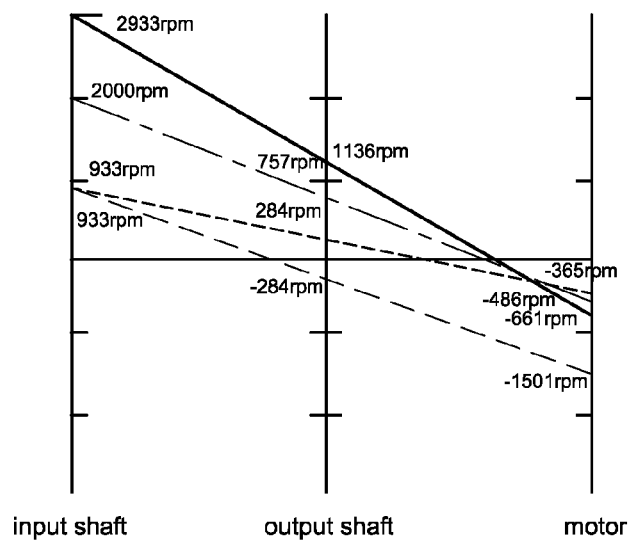

2. Differential gear set: As shown in FIG. 7, there are two kinds of input power. The first one makes use of the output power of the power allotment unit 3 as its input; the second one uses the power produced by forward and reverse rotation of the dynamo 1 (motor-generator) to control the performance of the non-step speed changer 4. With this scheme the power output from the output shaft of the differential gear set will be able to maintain the engine 2 working at the most preferable region at any different roadway condition and vehicle speed. As shown in FIG. 8(A) to FIG. 8(C), there may be three possible arrangements.

The vehicle's active electrically controlled non-step speed change mechanism according to the present invention is more advantageous and effective compared to that made of the conventional technique, namely:

1. The mechanism can control the internal combustion engine to work at the most preferable region at any different roadway condition and vehicle speed thereby minimizing the fuel consumption and the exhaust gas.

2. The engine is able to work at the most preferable region and the motor is able to output an optional torque for the vehicle running in any speed mode (low, medium, high) thereby attaining the aim of development of a highly efficient hybrid power vehicle.

3. The present invention contributes to stimulating the automobile manufacturers the interest to develop compact, high efficiency and low cost hybrid power vehicles.

While the present invention has been particularly shown and described. With reference to a particular embodiment thereof, it will be understood by those skilled in the art that various changes in form and detail may be effected therein without departing from the spirit and scope of the invention as defined by the appended claims.

What is claimed is:

1. An active electrically controlled non-step speed change mechanism for a vehicle, comprising:

a dynamo rotating in forward direction to serve as a motor to provide an power allotment unit with an operation power, and rotating in reversed direction to serve as a generator to charge a storage battery to store electricity therein;

an internal combustion engine to provide said power allotment unit with operating power;

the power allotment unit receiving the output from said dynamo or said internal combustion engine, and transmitting a combined power to an active electrically controlled non-step speed changer; and the active electrically controlled non-step speed changer receiving the power transmitted from said power allotment unit to control vehicle speed according to different roadway condition and vehicle load and finally transmit the power to wheels;

wherein said motor and said internal combustion engine are able to work at the most preferable condition in all low, medium and high speed operation modes, wherein said active electrically non-step speed control is performed by a planetary gear set connection, and wherein said planetary gear set non-step speed change employs two sources of power input, the first one is use of the output power of said power allotment unit as an power input, the second one uses the power produced by forward and reverse rotation of said dynamo (motor-generator) as an input such that the power output from the output shaft of said planetary gear set will be able to maintain said internal combustion engine working at the most preferable region at any different roadway condition and vehicle speed.

2. The mechanism of claim 1, wherein at the low speed mode, said storage battery imparts driving power to said motor which rotates at a low speed but a high power to transmit the power to said power allotment unit and then to said active electrically controlled non-step speed changer after proper allotment thereby allowing said motor to operate with the most preferable torque output.

3. The mechanism of claim 1, wherein at the medium speed mode, said motor runs to reach certain speed, it may not be able to supply power with a sufficient torque required by the vehicle any more, at this moment a vehicle computer indicates said internal combustion engine to start working and transmit power thereof to said power allotment unit, and then to said active electrically controlled non-step speed changer after a proper allotment thereby controlling said internal combustion engine to work at the most preferable region, if the remaining electricity in the storage battery is judged to be insufficient by the computer, said dynamo acts as the generator to charge said storage battery.

4. The mechanism of claim 1, wherein at the high speed mode, in case vehicle's load increases owing to bad roadway condition or the vehicle needs to accelerate, said internal combustion engine will no more be possible to maintain working at preferable region to withstand increase of the load or speed, then a vehicle computer instructs said motor and said internal combustion engine to work simultaneously to transmit power thereof to said power allotment unit, and then to said active electrically controlled non-step speed changer after proper allotment thereby controlling said motor and said internal combustion engine to return to their respective preferable working region.

5. An active electrically controlled non-step speed change mechanism for a vehicle, comprising:

a dynamo rotating in forward direction to serve as a motor to provide an power allotment unit with an operation power, and rotating in reversed direction to serve as a generator to charge a storage battery to store electricity therein;

an internal combustion engine to provide said power allotment unit with operating power;

the power allotment unit receiving the output from said dynamo or said internal combustion engine, and transmitting a combined power to an active electrically controlled non-step speed changer; and the active electrically controlled non-step speed changer receiving the power transmitted from said power allotment unit to control vehicle speed according to different roadway condition and vehicle load and finally transmit the power to wheels;

wherein said motor and said internal combustion engine are able to work at the most preferable condition in all low, medium and high speed operation modes, wherein said active electrically non-step speed control is performed by a differential gear set connection, and wherein said differential gear set non-step speed change employs two sources of power input, the first one uses the output power of said power allotment unit as an input, the second one uses the power produced by forward and reverse rotation of said dynamo (motor-generator) to control the performance of the non-step speed changer such that the power output from the output shaft of said differential gear set will be able to maintain said internal combustion engine working at the most preferable region at any different roadway condition and vehicle speed.

6. The mechanism of claim 5, wherein at the low speed mode, said storage battery imparts driving power to said motor which rotates at a low speed but a high power to transmit the power to said power allotment unit and then to said active electrically controlled non-step speed changer after proper allotment thereby allowing said motor to operate with the most preferable torque output.

7. The mechanism of claim 5, wherein at the medium speed mode, said motor runs to reach certain speed, it may not be able to supply power with a sufficient torque required by the vehicle any more, at this moment a vehicle computer indicates said internal combustion engine to start working and transmit power thereof to said power allotment unit, and then to said active electrically controlled non-step speed changer after a proper allotment thereby controlling said internal combustion engine to work at the most preferable region, if the remaining electricity in the storage battery is judged to be insufficient by the computer, said dynamo acts as the generator to charge said storage battery.

8. The mechanism of claim 5, wherein at the high speed mode, in case vehicle's load increases owing to bad roadway condition or the vehicle needs to accelerate, said internal combustion engine will no more be possible to maintain working at preferable region to withstand increase of the load or speed, then a vehicle computer instructs said motor and said internal combustion engine to work simultaneously to transmit power thereof to said power allotment unit, and then to said active electrically controlled non-step speed changer after proper allotment thereby controlling said motor and said internal combustion engine to return to their respective preferable working region.

* * * * *